SELECTIVE SIGNALING DEVICE

Filed Nov. 14, 1956 3 Sheets-Sheet 1

INVENTOR
H. H. ABBOTT
BY
A. M. Hassell
ATTORNEY

INVENTOR
H. H. ABBOTT
BY
A. M. Hassell
ATTORNEY

INVENTOR
H. H. ABBOTT
BY A.M. Hassell
ATTORNEY

United States Patent Office 3,012,226

Patented Dec. 5, 1961

3,012,226

SELECTIVE SIGNALING DEVICE

Henry H. Abbott, Yonkers, N.Y., assignor to Bell Telephone Laboratories, Incorporated, New York, N.Y., a corporation of New York Filed Nov. 14, 1956, Ser. No. 622,126
15 Claims. (Cl. 340—164)

This invention pertains to selective signaling systems and more particularly to such systems in which each station is effectively signaled by a different permutation of sequentially transmitted pulses, the pulses being of alternating current and distinctive according to the number of cycles of which they are composed.

A variety of selective signaling systems have heretofore been proposed and have been utilized by railroads and public utilities. Effective systems have, however, been relatively expensive, and it is therefore one general object of this invention to reduce the cost thereof.

It is another object of this invention to greatly reduce the bulk of the apparatus required at each station, thereby to permit the advantageous utilization thereof in systems in which stations are portable.

It is another object of this invention to reduce heat dissipation and power consumption of signaling apparatus, thereby increasing economy of operation.

In accordance with one feature of this invention, a counting chain of the shift-register type is advantageously utilized for counting the number of cycles in both the transmitted and received pulses, thereby providing an efficient and economical utilization of components.

In accordance with another feature of this invention, miniature electronic devices comprise the active elements, thereby advantageously reducing the aforementioned bulk and minimizing power consumption.

In accordance with yet another feature of this invention, pulses induced in the counting chain cores are advantageously utilized both to switch succeeding cores and to selectively activate associated control devices, thereby increasing circuit efficiency.

These and other objects and features of the invention will be apparent from the following description, by way of example, with reference to the drawing in which:

FIG. 1 schematically depicts signaling apparatus at one of a plurality of stations connected to a closed loop;

FIG. 2 schematically depicts signaling apparatus at another station on the loop;

Figure 1:
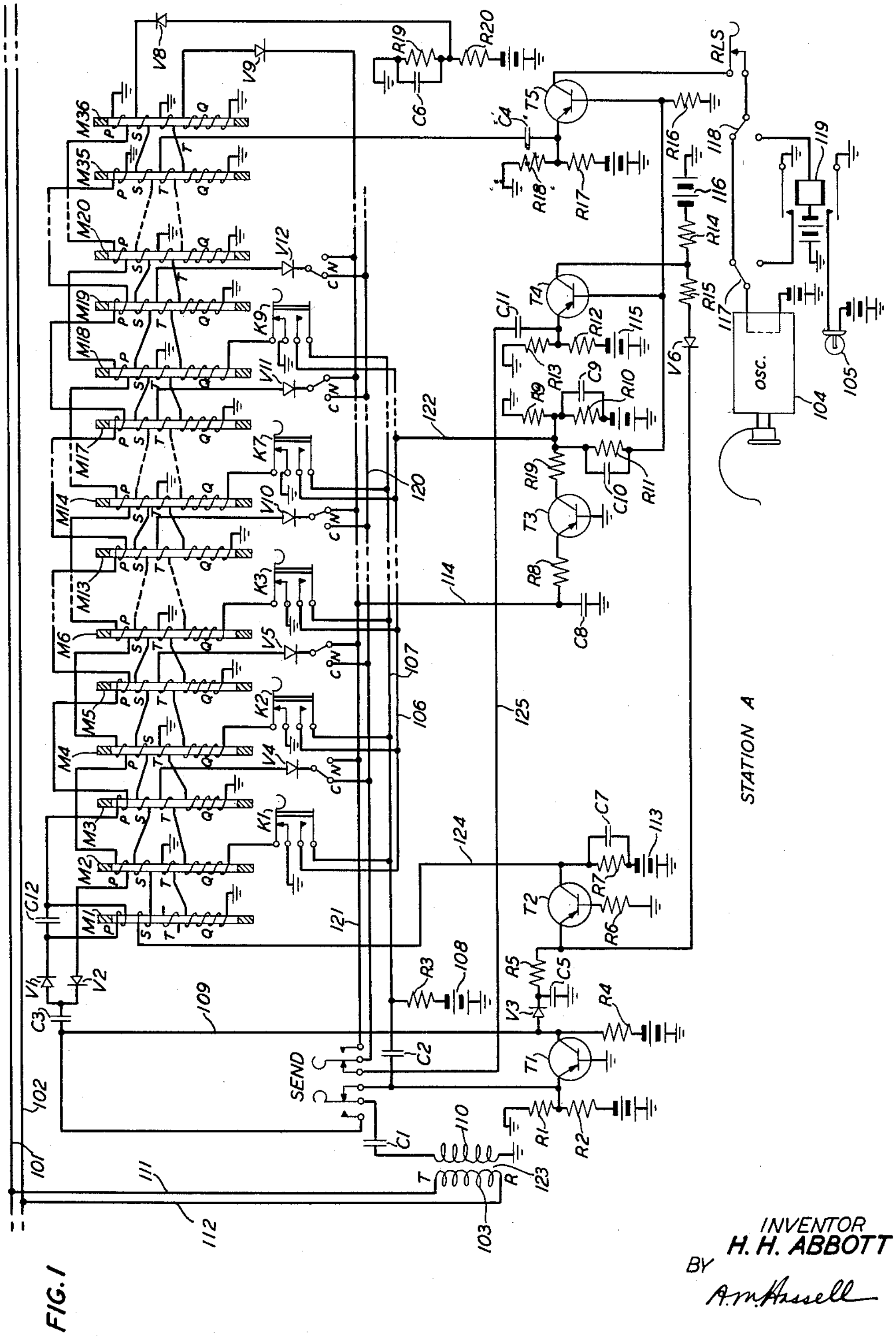
Figure 2:
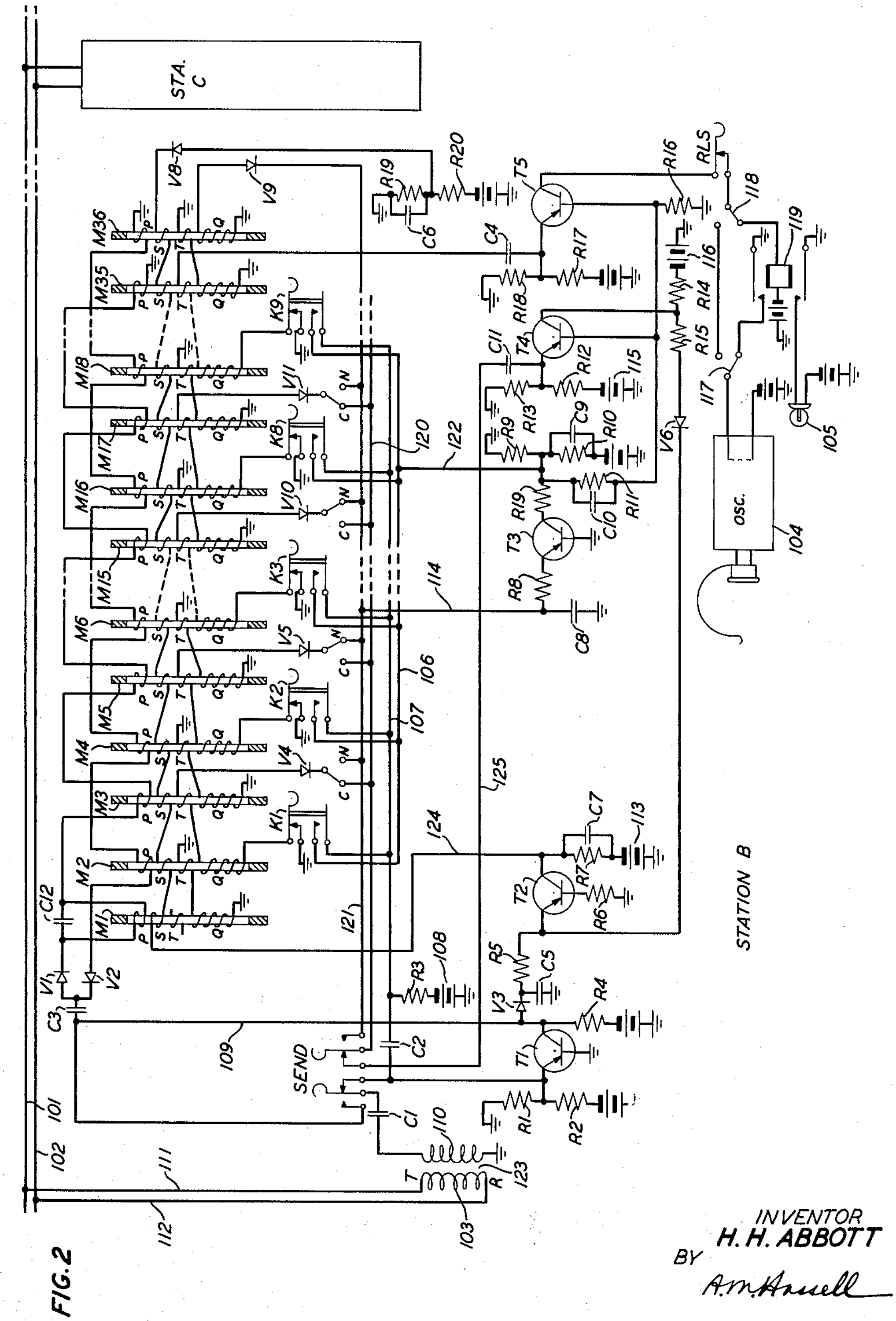

Now turning to the figures, it will be noted that the devices of FIGS. 1 and 2 are connected in common across line conductors 101 and 102. Additional similar devices may be added to the line and each may be rendered effective to selectively receive and transmit signals; to receive by appropriately setting certain of the switches CN according to principles hereinatfer more fully set forth; to transmit, by sequentially operating selected ones of the keys K1–K9 while depressing the send key.

Each station is identified by a different multidigit number, and once the switches CN are set to correspond to that multidigit number, they are thereafter retained in their positions unless and until the identifying number is changed. If, for example, the identifying number of station A (FIG. 1) is to be 188, the CN switches at cores M3 and M19 are switched to close the left-hand contacts thereof, and a connection is made from core M35 to capacitor C4. These cores, i.e., M3, M19 and M35, are selected according to the following rule. The first identifying number (number 1 in the example) is multiplied by two and the product is added to one, i.e., $1\times2=2$, $2+1=3$. Thus, core M3 is selected. The number of the second core will be the sum of the first two numbers multiplied by two and added to one, i.e. $(1+8)(2)=18$, $18+1=19$. Thus, core M19 is the second selected core. The number of the third core will be the sum of the first three numbers multiplied by two and added to one, i.e. $(1+8+8)(2)=34$, $34+1=35$. Thus, core M35 is the third selected core.

When the first of a series of signal pulses is sent over the loop, a shift-register type counting chain of magnetic cores M1–M36 at each station (other than the station at which the pulses are being generated) begins to count the number of cycles contained therein by sequentially switching, i.e., magnetically shifting, the cores. If the number of cycles in the first pulse does not correspond to the number of a core at which one of the CN switches has been set, the next to last switched core induces a pulse which is effective to cause the counting chain to be reset to zero during the inter-pulse pause. On the other hand, if such number does correspond to the number of a core at which one of the CN switches has been set, the next to last switched core induces a pulse which is effective to cause the registration of the count to be retained during the interpulse pause and when the next pulse is received, sequential switching of the cores will be resumed and will progress until it reaches the core which represents the sum of the number of cycles contained in both pulses. If one of the CN switches has not been set to this core, the counter will be reset to zero during the next inter-pulse pause. However, if one of the CN switches has been set to this core the total count will be retained, and when the next pulse is received, sequential switching will be resumed and will progress until it reaches the core which represents the sum of the number of cycles contained in all three pulses. If this core is the one which is connected to an alarm or indicating device, as for example core M35 in FIGS. 1 and 2, the counter will be rendered effective to operate such device, thereby providing visual or audible indication. On the other hand, if the core at which the sequential switching stops is not connected either to a set CN switch or an alarm device, the counter will be reset to zero.

Since the CN switches are arranged differently at the different stations, it will be apparent that the count will progress through only one of the counting chains to the alarm connection and thereby signal only the station which is represented by the permutation of the transmitted pulses.

All of the stations are identical with respect to the generation and transmission of signaling pulses. To transmit signals, the send key is depressed and appropriately selected ones of the keys K1–K9 are sequentially operated as mentioned above. When each of the selected keys is operated, a pair of transistors is activated to generate an alternating signal. The number of cycles generated is counted by the counter and when it equals the number represented by the depressed key, generation is terminated and cannot again begin until the depressed key is released, after which any one of the keys may be depressed to initiate the generation of another pulse.

The keys that are depressed represent the code identification number (directory number) of the called station and, in the manner hereinbefore set forth, result in the activation of the alarm device thereat, thereby to signal the attendant that his station is being called.

Now turning more specifically to the drawing, FIG. 1 will be noted to depict schematically the signaling apparatus associated with one of the aforementioned stations which, for mnemonic purposes, may be designated station A. It is seen to comprise five transistors T1–T5, line transformer 123, a send key, nine digit transmitting keys K1–K9, an audio oscillator 104, a visual indicating lamp 105, a shift-register type counting chain which comprises magnetic cores M1–M36, suitable sources of operating potential, and various circuit resistors, capacitors and asymmetrical current devices.

It should be understood that additional apparatus (not shown) will be required to transmit and receive speech or other intelligence-transmitting signals if such transmission is desired, the apparatus herein considered being operative solely to perform station calling functions. Any of a variety of conventional apparatus, well known in the art, may be utilized to transmit and receive speech or other similar intelligence and such does not form a part of this invention.

In the specific illustrative embodiments set forth in the figures, a signaling code consisting of three successive pulses having a sum of 17 cycles is required. It will, however, be apparent from the following detailed description that other codes could be readily employed without departing from the spirit of the invention; for example, a code consisting of four pulses totaling twenty cycles could be employed.

Operation of the circuits while transmitting and receiving may be more readily understood when considered separately, and the following detailed description is therefore divided into two parts which deal respectively with transmission and reception.

*Operation while transmitting*

When it is desired to call a station on the loop, the following operations are performed at the calling station:

The send key is depressed and is retained in the depressed condition while three of the pulse selection keys K1–K9 are sequentially operated.

Normally, each of the transistors T1–T5 is in its low current-conducting state, the resistance between the collector and the base being of a high order of magnitude. This condition prevails as long as the emitter current is low. With respect to transistor T1, current does not flow throught the emitter because the emitter is connected to voltage divider R1—R2 at a point at which the potential is slightly below, i.e., more negative, than that of the base. Potentials normally resident at the emitter terminals of the remaining transistors T2–T5 will be discussed more fully below.

For purposes of illustration, it may be assumed that the send key and key K1 are now depressed. In response thereto a one-cycle pulse will be generated and transmitted over the line loop in the following manner.

When key K1 is depressed, its upper contacts open and its lower contacts close, thereby completing a path from the junction of resistors R9 and R10 over conductors 122 and 106, through the lower contacts of key K1 and thence over conductor 107 to the right-hand terminal of capacitor C2. The voltage impressed upon this right-hand terminal of capacitor C2 is ordinarily equal to the terminal voltage of battery 108 because normally there is no flow of direct current through resistor R3 since capacitor C2 does not pass direct current and since all of the keys K7–K9 are ordinarily open. However, when key K1 is depressed to complete the hereinbefore traced path, the voltage impressed upon the right-hand terminal of capacitor C2 is raised by the voltage-dividing action of the serially connected resistors R3 and R9, and this rise in voltage is effectively passed by the capacitor, thereby momentarily increasing the voltage impressed upon the emitter of transistor T1. As the emitter voltage is increased, emitter curent begins to flow, and in response to each incremental increase in emitter current, there is a corresponding but much greater increase in base-to-collector current.

As the collector current increases, the collector voltage becomes less negative, i.e., is raised, because of the increasing voltage developed across resistor R4. This change in collector voltage causes current to flow over three different paths. The first is from the collector terminal over conductor 109 and the left-hand normally open contacts of the send key to the right-hand terminal of capacitor C1, thereby changing the charge stored therein and inducing a corresponding momentary pulse of current which flows from the left-hand terminal of capacitor C1 through the right-hand coil 110 of the line transformer to ground. A voltage is thereby induced in winding 103 and is transmitted over conductors 111 and 112 to line conductors 101 and 102 respectively.

The second path over which current is caused to flow extends from the collector through asymmetrical current device V3 and resistor R5 to the emitter of transistor T2, thereby effectively activating transistor T2 and causing its base-to-collector impedance to fall to a relatively low value.

The third path extends from the collector of transistor T1 over conductor 109 to the left-hand terminal of capacitor C3, thereby changing the charge stored therein and inducing a corresponding momentary pulse of current which flows through asymmetrical current device V1 and thence through the primary windings P of each of the odd numbered magnetic cores M1–M35 to ground.

The aforementioned pulse of current which is induced in transformer winding 103 and which is conducted over the line, is the first half-cycle of the signal pulse.

Normally, when transistor T2 is inactive, i.e., in its high impedance state, current flows from battery 113 through resistor R7, conductor 124, and thence through the reset windings S of magnetic cores M1–M36. The direction of current flow and the polarity of the windings is such that the current, when flowing, is effective to set all the cores except M1 to one of two stable states, and it is further effective to set core M1 to the other of two stable states which, for the purpose of this description, may be denominated state 0 and state 1, respectively. Transistor T2, when in its low impedance state, effectively shunts and diverts the normal reset current away from the reset windings S of each of the cores M1–M36, thereby stopping the flow of current therethrough.

The increase in current flow through transistor T2 is effective to terminate the flow of current through the core reset windings S because the increased voltage developed across resistor R7 raises the potential applied to the left-hand terminal of the serially connected S windings to a level more positive than the potential existing at the junction of resistors R19 and R20, thereby back-biasing asymmetrical current device V8 and therefore terminating the flow of current therethrough.

The aforementioned pulse of current which flows through V1 and the primary windings P of the odd numbered cores is effective to change the magnetic state of any of these cores from magnetic state 1 to magnetic state 0. However, as hereinbefore stated, core 1 is the only core which is in state 1 and therefore is the only core whose magnetic state is changed by this flow of current. Capacitor C12 is connected across the primary winding P of core M1 in order to delay the effect of switching current, i.e., P winding current, therethrough until after the aforementioned current flowing through the S windings has been effectively terminated.

In response to the change of the magnetic state of core 1, a voltage pulse is induced in the Q winding thereof, and current which flows in response thereto is conducted through the T winding of core M2 over the obvious path. This current is effective to switch core M2 from magnetic state 0 to state 1, thereby inducing a voltage pulse in each of the windings thereof. No further switching takes place in the core chain at this time, however, since none of the pulses induced in the windings of core M2 is effectively utilized. Insufficient voltage is induced in the S winding to operatively effect any of the remaining cores or associated circuits because of the number of turns in the winding and because of the impedance of the series connected elements described above. The pulse induced in the T winding tends to oppose the flow of current therethrough from the Q winding of core M1 but is insufficient to substantially affect the magnitude thereof because of the ratio of the number of turns in the Q and T windings, the former having many more turns than the T windings. The pulse induced in the Q winding causes no current to flow therethrough since the circuit thereof is open at the upper normally closed contacts of key K1. Therefore, when core M1 is switched to state 0, core M2 is the only core set to state 1.

When the charge on capacitor C2 has become stabilized after having been changed by the aforementioned redistribution of voltage resulting from the closure of key K1, the voltage at the emitter of transistor T1 returns to normal and current ceases to flow from the base to the collector. The voltage developed across resistor R4 therefore falls and the potential at the junction of the collector, capacitor C3 and asymmetrical current device V3 is rendered more negative, thereby causing capacitor C3 to become partially discharged. In addition, capacitor C1, which is connected to the collector of transistor T1 over the path hereinbefore traced, becomes partially discharged, and the current resulting therefrom flows through the primary winding 110 of the line transformer to ground, thus inducing the second half-cycle voltage of the first complete alternation in the winding 103 from whence it is transmitted over the line loop.

The aforementioned current which flows from capacitor C3 during the discharge thereof causes corresponding current to flow through asymmetrical current device V2 and the primary windings P of all the even numbered cores M2–M36. These windings are oriented on the cores with a polarity such that current passed by device V2 will be operative only to change the magnetic states thereof from state 1 to state 0. Since core M2 is the only core in state 1, it alone is switched by the aforementioned current and, in switching, induces a second pulse in the Q winding thereof. However, no current can flow through the Q winding because key K1 is depressed and the upper contacts thereof are therefore open. Accordingly, core M3 remains in the 0 condition.

As mentioned before, the charge on capacitor C2 has become stabilized, transistor T1 is therefore in its nonconducting state, the charge on capacitor C3 is stabilized, and no further operation takes place.

When key K1 is released, the path connecting the right-hand terminal of capacitor C2 to the junction of resistors R9 and R10 is broken, thereby resulting in a change in potential and a corresponding change in charge thereon. However, the pulse of voltage which is consequently impressed upon the emitter of transistor T1 is of opposite polarity to that which was conducted thereto at the time key K1 was closed. The pulse of voltage which is now received thereat tends to drive the emitter more negative and, since this tends to retain the transistor in its nonconducting state, it has no appreciable effect thereupon.

The first signaling pulse which, in this example, constitutes one cycle, has thus been generated and transmitted over the line loop; and the time interval during which the next key is selected is called the interdigital pause.

During the interdigital pause, the charge which had been stored in capacitor C5 is dissipated and transistor T2 therefore returns to its original high resistance condition. Current which had been flowing therethrough is therefore redirected through the S windings of all the cores as hereinbefore described, thereby resetting cores M2 and M1 to the 0 and 1 states respectively. Accordingly, the chain of cores is returned to its original condition and is prepared to control the number of alternations which characterize the next pulse.

If, for example, the next pulse is to contain seven cycles, key K7 will be selected and depressed, the send key being retained in its operated position. Generation and transmission of the first cycle of the pulse is identical to that hereinbefore explained with respect to the first pulse except that the path which connects the junction of resistors R9 and R10 to the right-hand terminal of capacitor C2 is extended over the lower contacts of key K7 instead of similar contacts of key K1; and, since key K1 is not now operated, the two hereinbefore mentioned pulses which are sequentially induced in the Q winding of core M2 when it is alternately switched to the 1 and 0 states are not prevented from being effective to produce current flow therethrough by the aforementioned open circuit at the normally closed contacts of key K1, since this key is not operated and the contacts are therefore closed. However, the pulse which is induced in the Q winding when core M2 is switched from the 0 to the 1 state is of such polarity that it is prevented from causing appreciable current to flow by asymmetrical current device V4. On the other hand, the pulse induced in the Q winding when core M2 is switched back to the 0 state is of opposite polarity and is effective to cause current to flow over a path from ground through the upper contacts of key K1, the Q winding, the T winding of core M3, asymmetrical current device V4, the left-hand contacts of switch CN, conductor 120, the right-hand normally open contacts of the send key, conductor 121 and conductor 114 to the upper terminal of capacitor C8, thereby inducing a charge therein. Two operations take place as a result of this flow of current. The first of these is the switching of core M3 from the 0 to the 1 magnetic state; and the other is the activation of transistor T3 by the increased potential which is conducted to the emitter thereof from capacitor C8 via resistor R8.

While in the activated condition, transistor T3 effectively exhibits low impedance between its base and collector electrodes, thereby drawing current and changing the voltage at the junction of resistors R9 and R10 to a more positive value. This change in potential is transmitted over a path from the junction of resistors R9 and R10 over conductors 122 and 106, through the lower contacts of key K7 and thence over conductor 107 to the right-hand terminal of capacitor C2, thereby changing the charge stored therein. A corresponding pulse is transmitted from the left-hand terminal of capacitor C2 to the emitter of transistor T1 and, as explained before, results in the effective lowering of impedance between the base and collector electrodes thereof, thereby instituting a repetition of the conditions which initiated the generation of the first alternation of the initial cycle.

The reactivation of transistor T1 so closely follows its deactivation that capacitor C5 does not appreciably discharge therebetween, thereby retaining transistor T2 in its activated condition as long as the generation of alternating voltage continues. However, as hereinbefore explained, during the interdigital pause capacitor C5 discharges sufficiently to deactivate transistor T2, thereby redirecting current through the reset windings S and resetting the core chain to its original condition.

In response to the reactivation of transistor T1, capacitors C1 and C3 are again charged, thereby sending an additional alternating voltage half-cycle pulse over the line and initiating a flow of current from the right-hand terminal of capacitor C3 through asymmetrical current device V1 and the hereinbefore traced path through all of the odd numbered cores M1–M35. As hereinbefore stated, the P windings are poled in such manner that current thus flowing therethrough will switch only those cores which are in magnetic state 1. Since core M3 is the only one in such state, it alone will be switched by this current and therefore corresponding pulses will be induced only in the S, T and Q windings thereof. For reasons hereinbefore set forth, the pulses induced in the S and T windings are ineffective to produce any change, but the pulse induced in the Q winding is effective to cause current of substantial magnitude to flow in the T winding of core M4, thereby switching core M4 to the 1 state.

The charge stored in capacitor C8 leaks off and the emitter of transistor T3 is returned to its normal condition. Accordingly, voltage at the junction of resistors R9 and R10 becomes more negative and capacitor C2 is discharged. Transistor T1 is effectively cut off by the resulting pulse which flows thereto from capacitor C2, and capacitors C1 and C3 are discharged, thereby resulting in the transmission of the second half-cycle of the second cycle of the pulse over the line and in addition causing current to flow to the right-hand terminal of capacitor C3 through asymmetrical current device V2 and the P windings of each of the even numbered cores M2–M36. Current flowing through the P winding of core M4 is effective to switch it from the 1 to the 0 state, and the resulting pulse which is induced in the Q winding thereof flows through the T winding of core M5 and is effective to set core M5 from the 0 to the 1 condition.

The second cycle of the second pulse has now been completely generated and transmitted over the line and additional cycles will continue to be produced until the core is reached at which the path from ground through a Q winding is open at the selected key (key K7 in this example). Generation of alternating current will thereupon cease, since the path to the emitter of transistor T3 is open at the key contacts and the recurrent charging and discharging of capacitor C8 and the corresponding change in conduction of transistor T3, whereby the voltage at the junction of resistors R9 and R10 is changed, will be terminated. Thus, it will be seen that the magnetic cores act as a counting chain which, in cooperative association with transistors T1, T2 and T3, generate pulses each consisting of the number of cycles corresponding to the selected key.

*Operation while receiving*

The apparatus of FIGS. 1 and 2 is also effective to receive signaling impulses transmitted thereto over line conductors 101 and 102. As hereinbefore mentioned, apparatus at each station is different with respect to the positions of the switches CN. The arrangement of these switches determines the particular permutation of pulses to which a station will effectively respond since these switches determine the cycle count at which the counting chain retains its registration during the interdigital pause.

When the first half-cycle of a pulse is received over the line loop, it is effectively passed through the windings 103 and 110 of the line transformer and is then passed through capacitor C1 and the left-hand normally closed contacts of the send key to the left-hand terminal of capacitor C2 and the emitter of transistor T1. Transistor T1 is rendered conductive, thereby amplifying the signal, and the change in collector potential is conducted to capacitor C3 and to the emitter of transistor T2. Transistor T2 is rendered conductive and effectively shunts the resetting current which normally flows through the S windings of the cores M1–M36. The charging current flowing to capacitor C3 results in a corresponding flow through asymmetrical current device V1 and the P windings of the odd numbered cores M1–M35, thereby switching core M1 from the 1 to the 0 state. The resulting pulse which is induced in the Q winding of core M1 causes current to flow from ground through the Q winding thereof and the T winding of core M2, thereby switching core M2 from the 0 to the 1 condition. No further change takes place until the received voltage swings to the opposite polarity during the second half-cycle. Transistor T1 is thereby cut off and capacitor C3 is discharged. The discharge current flows through asymmetrical current device V2 from the P windings of all the even numbered cores M2–M36, thereby switching core M2 to the 0 condition. The pulse which is induced in the Q winding of core M2 is effective to cause current to flow through the T winding of core M3, asymmetrical current device V4, the left-hand contacts of switch CN, conductor 120, the right-hand normally closed contacts of the send switch, and thence over conductor 125 to the upper terminal of capacitor C11, thereby charging the capacitor and switching core M3 from the 0 to the 1 condition. The pulse thereby induced in the Q winding of core M3 is ineffective to change the magnetic state of core M4 because it is of improper polarity. However, the current that flows into capacitor C11 is effective to change transistor T4 from its normally nonconducting state to a stable conducting state. Resistances R12, R13 and R14 together with the connected batteries 115 and 116 are of magnitudes such that transistor T4 will reside in either of two stable states, i.e., a nonconducting high resistance state or a low resistance conducting state. When the transistor is triggered from one of these states to the other, it remains in the new state until triggered therefrom by some external potential. Accordingly, after having been triggered from its high resistance to its low resistance state, transistor T4 will continue to conduct current until it is reset by the application of an external potential as hereinafter described.

Current which flows through transistor T4 is effective to raise the potential at the collector thereof. This results in the transmission of positive polarity voltage through asymmetrical current device V6 to the emitter of transistor T2, thereby supplementing the positive voltage which was conducted thereto from the collector of transistor T1 through asymmetrical current device V3 and resistor R5. Since transistor T4 may remain in its conducting state for an indefinite period, the aforementioned positive potential resulting therefrom will retain transistor T2 in its conducting condition for a corresponding indefinite period. It will therefore be noted that if the time interval between received pulses, i.e., the interdigital pause occurs immediately after the switching of a core which is connected through the left-hand terminal of one of the switches CN to transistor T4, transistor T4 will retain transistor T2 in its conducting state throughout the interdigital pause, thereby preventing the cores from being reset; whereas if the pause occurs immediately after the switching of one of the cores not thus connected, transistor T4 will be reset and unable to retain transistor T2 in its conducting state. Therefore when the charge on capacitor C5 is dissipated during the interdigital time interval, the emitter of transistor T2 is returned to its original state, thereby effectively restoring transistor T2 to its high resistance condition and resetting the entire chain of cores by means of current thereby diverted through the serially connected S windings.

In the embodiments of FIGS. 1 and 2, the CN switches are arranged to render the counters effectively responsive to a first signaling pulse of one cycle. Therefore if, for example, the first pulse consists of one cycle, transistor T4 is activated to hold transistor T2 in its conducting state during the interdigital pause.

When the second half-cycle voltage is received, it effection of the second pulse, it is amplified by transistor T1 and is conducted to the emitter of transistor T2 and to the left-hand terminal of capacitor C3. As before, it produces a corresponding current which flows through asymmetrical current device V1 and the P windings of the odd numbered cores, thereby switching core M3 from the 1 to the 0 condition. The resulting pulse of current in the Q winding thereof is effective to switch core M4 from the 0 to the 1 condition.

When the second half-cycle voltage is received it effectively induces current to flow through device V2 and the P windings of the even numbered cores, thereby switching core M4 from the 1 to the 0 condition. A corresponding flow of current is induced in the Q winding thereof and follows a path from ground over the normally closed contacts of key K2, the Q winding, the T winding of core M5, device V5, the right-hand contacts of switch CN, conductor 121, conductor 114, and resistor R8 to the emitter of transistor T3, thereby activating transistor T3 and changing the collector potential thereof. A part of this change in potential is conveyed through resistors R19 and R11 to the base of transistor T4 and changes the operating condition of transistor T4 sufficiently to switch it back to its original high resistance condition. The voltage at the junction of resistors R14 and R15 is therefore returned to normal and asymmetrical current device V6 becomes back-biased, thereby effectively interrupting the connection to the emitter of transistor T2. Transistor T2 is, therefore, solely responsive to signals received from transistor T1 through device V3 and resistor R5, and therefore becomes effective to revert to its original high resistance state when the incoming signal is terminated.

Figure 5:
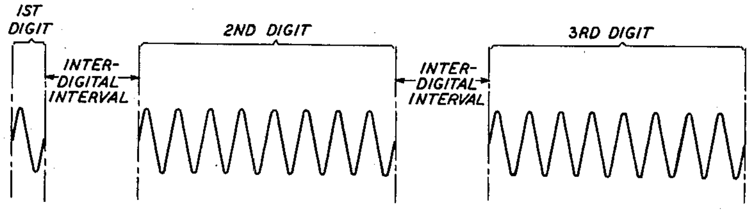
FIG. 5 similarly illustrates pulses to which the apparatus of FIG. 1 is effectively responsive.

As the incoming voltage rises and falls during the second cycle of the second pulse, currents are caused to flow first through asymmetrical current device V1 and then through asymmetrical current device V2 in the manner hereinbefore set forth. Current flowing through VI is effective to advance magnetic condition 1 from core M5 to M6, and the current which flows through device V2 is effective to step the condition from core M6 to core M7 (not shown). Each complete cycle of voltage will effectively advance this condition through the next two cores. When the last cycle of the second pulse has been thus "counted", magnetic condition 1 will be the condition of the one core which is identified with a number equal to one plus twice the total number of cycles received in pulses 1 and 2. Thus, for example, if as shown in FIG. 5, the number of cycles in the first pulse is one and the number of cycles in the second pulse is 8, condition 1 will exist in core M19, and the core chain of FIG. 1 will not be reset to its original condition during the next interdigital pause because of the activation of transistor T4 which occurs in response to the pulse conducted from ground through the upper contacts of key K9, the Q winding of core M18, the T winding of core M19, asymmetrical current device V12, the left-hand contacts of switch CN, conductor 120, the right-hand normally closed contacts of the send key and conductor 125 to capacitor C11. As before, transistor T4 is triggered to its conducting state, thereby effectively locking transistor T2 in its conducting state until transistor T4 is reset during the next succeeding pulse.

When the received voltage rises with the first alternation of the third pulse, magnetic state 1 is effectively advanced from core M19 to core M20, and each subsequent half-cycle voltage is effective to advance this state to the next core. If the third pulse is composed of eight cycles, it will be effective in this particular illustrative embodiment to advance magnetic state 1 to core M35, core M35 being representative of the total number of cycles of the three received pulses (1+8+8=17 cycles).

In response to the switching of core M34 to state 0 by the last half-cycle voltage, a pulse is induced in the Q winding thereof (not shown) and current flows through the T winding of core M35 and thence to the upper terminal of capacitor C4, thereby setting core M35 to magnetic state 1. A corresponding current flows from the lower terminal of capacitor C4 to the emitter of transistor T5, thus switching transistor T5 from a first stable (nonconducting) state to a second stable (conducting) state. Resistors R16, R17, and R18 together with associated battery potentials are chosen to give transistor T5 the operating characteristics which manifest themselves in these two stable states, and transistor T5 will remain in the aforementioned second (conducting) state until it, like transistor T4, is reset by activation of transistor T3. Current which flows through the collector of transistor T5 is effective to activate oscillator 104 through release key RLS, or it may be effective to activate relay 119 when switch 118 is appropriately closed through its lower contacts. Relay 119, when operated, may be effective to activate both the oscillator and indicating lamp 105 over the normally open contacts thereof and the lower contacts of switch 117. The alarm devices may be reset by operating the release key RLS.

If the last of the three pulses consists of a greater or lesser number of cycles than eight (in the illustrative embodiment of FIG. 1), the entire counting chain will be reset to its original condition. This can be readily seen by considering first the effect of a pulse consisting of seven cycles or less, wherein the No. 1 magnetic condition will be advanced to a core lying between M19 and M35. Since no one of these cores is connected to conductor 120 through left-hand contacts of a switch CN, transistor T4 will not be activated in response to the receipt of the last cycle of the pulse, and transistor T2 will return to its normal high impedance state after the elapse of the brief interval during which capacitor C5 is discharged, thereby diverting reset current through the core S windings and resetting the cores. Since this brief interval is far less than the time required for an operator at the sending station to depress another key, the counting chain will be reset and will not effectively respond to a fourth pulse consisting of a number of cycles equal to the number required to "fill out" the third pulse.

If on the other hand, the third pulse consists of more than eight cycles, the first alternation of the ninth cycle will be effective to step magnetic condition 1 from core M35 to core M36, and a pulse induced in the Q winding of core M36 will be conducted through asymmetrical current device V9, conductor 121, conductor 114 and resistor R8 to the emitter of transistor T3, thereby activating transistor T3. As before, transistor T3 is effective to reset transistor T4 (T4 having been activated by the pulse received at the time core M35 was switched to its No. 1 magnetic condition) and is further effective to reset transistor T5. Transistor T5 is therefore, activated only during one cycle, and this is an insufficient period of time to allow the aforementioned alarm devices to effectively operate. Thus, it can be seen that the apparatus of FIG. 1 will effectively activate the aforementioned alarm devices only when three pulses of preselected numbers of cycles are received in a predetermined sequence.

The apparatus of FIG. 2 is identical to that of FIG. 1 except for the positions of the station identification switches CN. Whereas in FIG. 1 these switches were set to complete paths over their left-hand contacts at cores M3 and M19, thus establishing a selective calling code of three pulses composed of one cycle, eight cycles and eight cycles; the switches in FIG. 2 are set to complete paths over their left-hand contacts at cores M3 and M17, thus establishing a selective calling code of three pulses composed of one cycle, seven cycles and nine cycles.

Similar apparatus identified as station C (FIG. 2) is shown in block form bridged across line conductors 101 and 102. This apparatus will be identical to that of stations A and B except for the positions of the contacts of the CN switches which, for station C, will be arranged to provide still another identifying code.

It will be apparent that additional stations could be connected into the system and that the CN switches thereof would be arranged still differently to provide additional distinctive calling codes. If it were desired to connect an especially large number of such stations together in one system, the core counting chain at each could be extended, and an additional, i.e., fourth, tap could be made over a CN switch from the chain to transistor T4, thereby adapting each station for reception of a four-pulse code.

Figure 3:
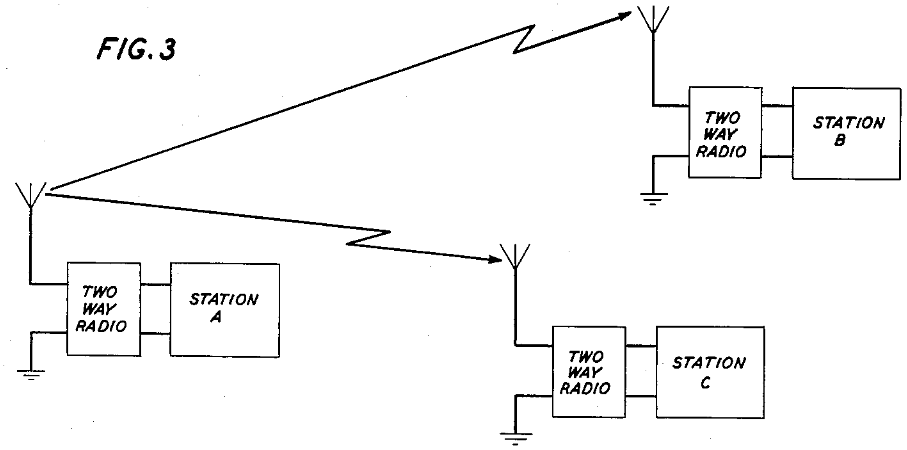
FIG. 3 depicts in block diagram form three stations of a radio loop in which the subject-matter of this invention may be advantageously utilized.
Figure 4:
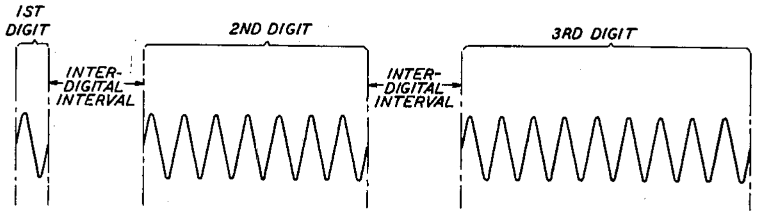
FIG. 4 illustrates the number of cycles contained in each of three pulses to which the apparatus in FIG. 2 is effectively responsive.

Although the specific illustrative embodiments of FIGS. 1 and 2 contemplate a wire communication circuit, it will be obvious to one skilled in the art that the apparatus is suitable for use in radio or other types of signaling systems. FIG. 3 depicts such a radio system in block diagram, and it will be obvious to one skilled in the art that signaling pulses could be transmitted via radio and, after demodulation, be introduced into the apparatus of FIGS. 1 and 2 in the manner well known in the art. Correspondingly, pulses generated by the apparatus could be effectively used to modulate a transmitted signal.

While I have illustrated my invention by two particular embodiments thereof, the invention is not limited to the specific circuits therein disclosed. Various applications, modifications, and arrangements of the invention will readily occur to those skilled in the art. For example, all of the stations connected in a given system could be arranged to be responsive to a given conference code by appropriately selecting the aforementioned CN switches which are closed over their left-hand contacts.

What is claimed is:

1. Apparatus comprising a plurality of magnetic cores connected in tandem to form a counting chain, a send-receive switch connected to said chain, a plurality of digit-representing switches selectively connected to certain of the cores of said chain, means for receiving and transmitting alternating voltage pulses, an oscillator connected to said receiving and transmitting means, means interconnecting said receiving and transmitting means, said chain and said switches responsive to the receipt of pulses of alternating voltage when said send-receive switch is in the receive position for progressively switching said cores from one magnetic state to another thereby to count the number of cycles in said pulses, means including said last-mentioned means for rendering said cores effective to add the number of cycles in consecutively received pulses when said pulses are composed of predetermined numbers of cycles, means including said send-receive switch when in the send position responsive to the actuation of one of said digit-representing switches for activating said oscillator, means connecting said oscillator to said counting chain thereby to render said counting chain effective to count the number of cycles of voltage generated by said oscillator, and means including the actuated one of said digit-representing switches connecting one of said cores to said oscillator thereby to interrupt the oscillation thereof when said counter has counted a number equal to the number represented by said actuated one of said digit-representing switches.

2. A selective signaling device comprising, in combination, a chain of tandemly connected magnetic cores, a first transistor connected to said cores and responsive to each of a plurality of alternating voltage pulses for switching from one magnetic state to another a number of said cores representative of the number of cycles in each pulse, a second transistor connected to said first transistor and to said chain to enable said chain to count said cycles when energized and to reset said chain when deenergized, a third transistor connected to said second transistor and to preselected ones of said cores representing, in permutation, a plurality of coded pulses distinctive according to the number of cycles contained in each of said pulses, said third transistor being effective to hold said second transistor in said energized condition when said counting is momentarily interrupted at one of said preselected cores, thereby to prevent resetting during an interdigital pause when the preselected coded pulses are received in correct permutation, a fourth transistor connected to one of said cores representing the last of said coded pulses, said fourth transistor being activated by the switching of said one of said cores, and an alarm device connected to said fourth transistor and actuated by said fourth transistor when activated to produce an alarm signal, whereby in response to a plurality of pulses received in predetermined order and each having the proper number of cycles, said cores are progressively switched one at a time through said chain to said core representative of the last of said coded pulses, thereby to activate said fourth transistor and actuate said alarm device.

3. In combination, a counting chain comprising a plurality of tandemly connected devices each having two stable states, means for normally setting said counting chain to a predetermined condition, means for receiving electrical signals each comprising one or more voltage undulations, means connected to said chain for switching said devices from one stable state to another, means interconnecting said switching means with said receiving means responsive to the receipt of an electrical signal for rendering said switching means effective to switch one or more of said devices for each undulation in voltage in said signal thereby to count the number of undulations in said signal, and means for rendering said means for normally setting said counting chain ineffective to reset said chain to said predetermined condition when the last switched device in said chain is a preselected one of said devices.

4. Signaling apparatus comprising a counter including a plurality of bistate elements, a first control switch means, a plurality of other control switch means connected to certain of said bistate elements for presetting predetermined numbers in said counter, means for receiving and transmitting pulses of alternating current, means connected to said receiving and transmitting means and to said counter for causing said counter to count the number of cycles in said received pulses when said first control switch means is in a first operated condition, means connected to said counter for resetting said counter, means connected to said plurality of other control switches for preventing operation of said resetting means in the interval between received pulses when the count of a priorly received pulse coincides with a number preset in said counter by operation of one of said other control switch means, and means including said receiving and transmitting means, said counter, and one of said other control switch means for generating and transmitting pulses of alternating current each composed of the number of cycles determined by operation of said one of said other control switch means when said first control switch means is in a second operated condition.

5. Signaling apparatus in accordance with claim 4 wherein said bistate elements comprise magnetic cores having two stable magnetic states.

6. Signaling apparatus in accordance with claim 5 wherein said reset means includes means applying a reset bias to each of said magnetic cores and said means for preventing operation of said reset means comprises a first transistor, means connecting said first transistor to said operated other control switch means for operating said first transistor on switching of a magnetic core connected to an operated other control switch means and a second transistor connected to said first transistor and enabled on operation of said first transistor to shunt said reset bias means.

7. Signaling apparatus in accordance with claim 4 further comprising means responsive to said received pulses for preventing operation of said reset means.

8. Signaling apparatus comprising a counter including a plurality of stages of bistate elements, switch means connected to each of said stages for presetting predetermined numbers in said counter, means for receiving pulses of alternating current, means connecting said receiving means to said counter for causing said counter to count the number of cycles in said received pulses, means connected to said counter for resetting said counter, means connected to said switch means for preventing operation of said resetting means in the interval between received pulses when the number of cycles counted by said counter coincides with a predetermined number preset in said counter by operation of one of said switch means, and indicating means connected to the last stage of said counter for indicating reception of a particular number of pulses as preset by operation of particular ones of said switching means.

9. Signaling apparatus in accordance with claim 8 wherein said means connecting said receiving means to said counter includes means for directing half-cycles of one polarity of said received pulses to one element of each of said stages and half-cycles of the opposite polarity of said received pulses to the other element of each of said stages.

10. Signaling apparatus in accordance with claim 9 wherein each of said bistate elements comprises a magnetic element having two stable states of magnetization.

11. Signaling apparatus in accordance with claim 10 wherein said reset means includes a winding on each of said magnetic elements and means for applying bias current to said windings, said means for preventing operation of said resetting means including transistor means operated by switching of one of said magnetic elements connected to an operated switch means for shunting of said means for applying bias current to said windings.

12. Signaling apparatus in accordance with claim 11 further comprising means for operating said transistor means to shunt said bias current means on reception of said pulses.

13. In a signaling system, a counter comprising a plurality of stages of bistate elements, means for receiving pulses of alternating current and applying successive half-cycles to said counter, means for resetting said counter, means for inhibiting operation of said resetting means during application of said half-cycles to said counter, switch means connected to said stages for presetting predetermined numbers in said counter, and means connected to said switch means for inhibiting operation of said resetting means during the intervals between received pulses when the count of successive half-cycles in said counter coincides with an operated one of said switch means.

14. In a signaling system, the combination set forth in claim 13 wherein said bistate elements comprise magnetic elements having two stable states of magnetization.

15. In a signaling system, the combination set forth in claim 14 wherein said first-mentioned inhibiting means comprises a first transistor for shunting said resetting means and a second transistor responsive to said received pulses for enabling said first transistor and said second-mentioned inhibiting means includes said first transistor and a third transistor connected to said switch means for enabling said first transistor.

References Cited in the file of this patent

UNITED STATES PATENTS

| | | |
|---|---|---|
| 2,022,219 | Dimond | May 21, 1935 |
| 2,059,204 | Boswau | Nov. 3, 1936 |
| 2,373,134 | Massonneau | Apr. 10, 1945 |
| 2,403,873 | Mumma | July 9, 1946 |
| 2,418,521 | Morton et al. | Apr. 8, 1947 |
| 2,451,489 | Joel et al. | Oct. 19, 1948 |
| 2,547,034 | Mamor | Apr. 3, 1951 |
| 2,600,648 | Herrick | June 17, 1952 |
| 2,697,178 | Isborn | Dec. 14, 1954 |
| 2,740,948 | McCreary | Apr. 3, 1956 |